United States Patent Office 3,120,674
Patented Feb. 11, 1964

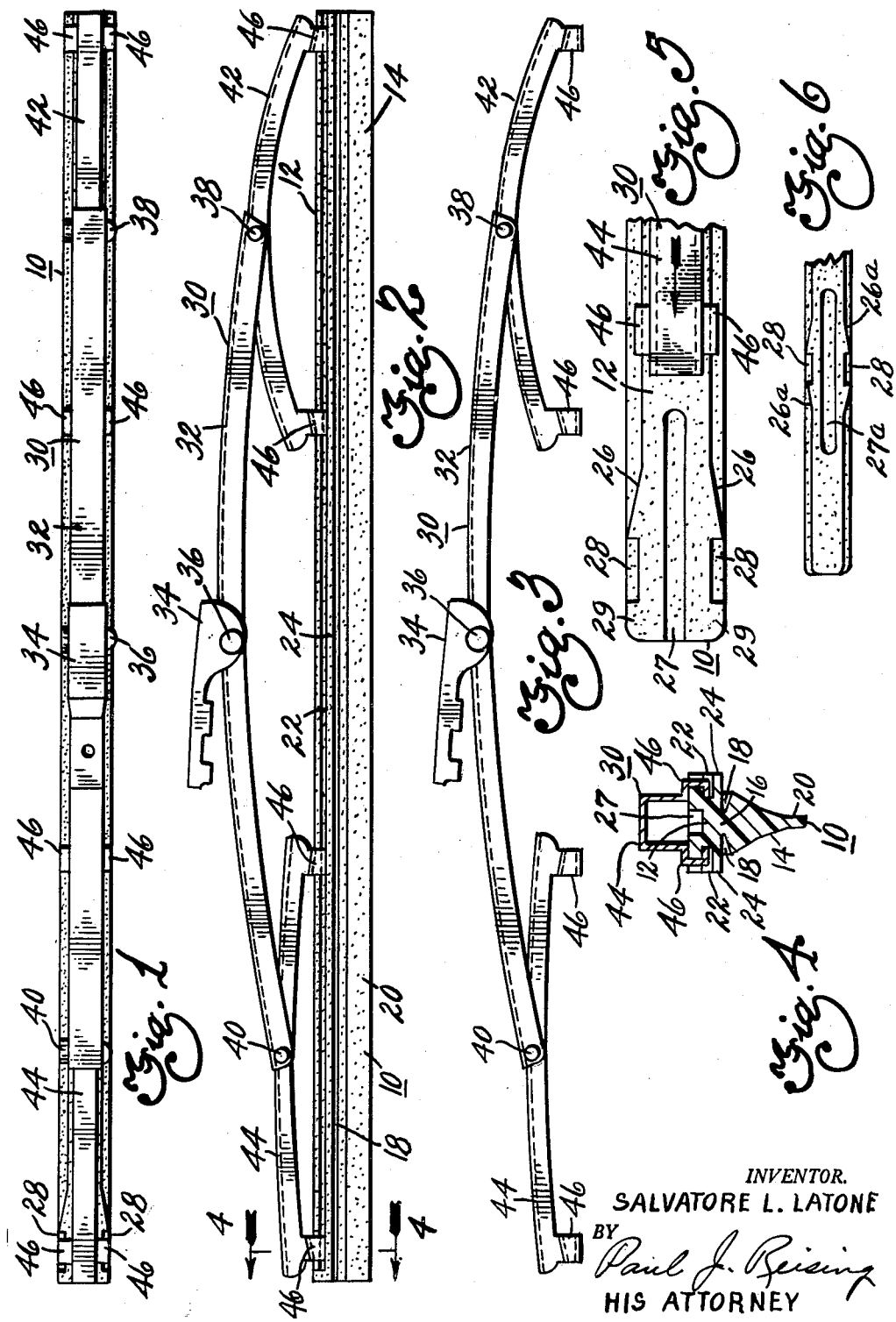

3,120,674
WINDSHIELD WIPER BLADE ASSEMBLY
Salvatore L. Latone, Rochester, N.Y., assignor to General Motors Corporation, Detroit, Mich., a corporation of Delaware
Filed Jan. 16, 1961, Ser. No. 82,810
2 Claims. (Cl. 15—250.42)

This invention pertains to windshield wipers, and particularly to an improved windshield wiper blade assembly.

Presently known windshield wiper blade assemblies for wiping curved windshields comprise two assemblies, namely a squeegee unit and a pressure distributing linkage, or superstructure. The squeegee unit and the superstructure are interconnected so as to permit relative sliding movement therebetween, while preventing inadvertent disassembly of the squeegee unit and the superstructure during normal wiper operation. Heretofore, readily releasable means for interconnecting the superstructure and the squeegee unit have been devised. However, prior readily detachable interconnecting means between the superstructure and the squeegee unit have been relatively expensive to manufacture and time consuming for assembly. The present invention relates to simplified readily releasable interlock means for connecting the squeegee unit and the superstructure of a windshield wiper blade assembly.

Accordingly, among my objects are the provision of readily releasable interlock means for connecting a pressure distributing linkage and a squeegee unit of a windshield wiper blade assembly; the further provision of readily releasable interlock means permitting the requisite lost motion between the superstructure and the squeegee unit; and the still further provision of releasable interlock means between a wiper blade assembly superstructure and a squeegee unit which can be engaged by relative sliding movement while requiring a compressive force to release the same.

The aforementioned and other objects are accomplished in accordance with the present invention by embodying compressible notched retention means in the back surface and adjacent one end of the squeegee unit. The squeegee unit may be of any type having a back surface of relatively hard flexible material, the preferred unit for the practice of the invention being that covered by United States patent application Serial No. 83,005 filed concurrently herewith in the names of Clyde A. Browne and Elmer E. Reese and assigned to the assignee of the present invention. Briefly, that application comprehends a squeegee comprising a unitary elongate elastomeric body having strata of different hardness, the wiping portion being formed at least in part by relatively soft strata and the back or retention portion by a relatively hard strata of greater width than thickness such that the body has greater flexibility in a plane normal to the surface to be wiped than in a plane parallel to the surface to be wiped. In accordance with the present invention, the retention portion is formed with notched marginal edges adjacent one end thereof with tapering side walls extending from the notches and with a slot between the notched side wall portions to permit sufficient compression of the end of the retention portion to facilitate assembly and disassembly with the superstructure.

The superstructure, or pressure distributing linkage, may be of any type known in the art comprising a plurality of pivotally interconnected yokes or a plurality of pivotally interconnected stacked levers, or a combination of yokes and levers. In the specifically disclosed embodiment, which is only exemplary, the pressure distributing linkage is of the triple yoke type comprising a primary yoke and a pair of secondary yokes, the ends of the secondary yokes having claws, or fingers, adapted to straddle the marginal edges of the back surface of the squeegee unit. The interlock is preferably effected at the inner, or heel, end of the wiper blade assembly and in order to interconnect the superstructure with the squeegee unit it is only necessary to engage the claws of the secondary yokes with the back surface of the squeegee unit and effect relative longitudinal movement therebetween whereby the interlock will be automatically effected by the tapered side edges of the squeegee unit. In order to disassemble the squeegee unit from the superstructure, it is necessary to manually compress the heel end of the back portion or surface thereof and effect a reverse relative longitudinal movement between the squeegee unit and the superstructure.

Further objects and advantages of the present invention will be apparent from the following description, reference being had to the accompanying drawings, wherein a preferred embodiment of the present invention is clearly shown.

In the drawings:

FIGURE 1 is a plan view in elevation of a windshield wiper blade assembly constructed according to the present invention.

FIGURE 2 is a side elevational view of a windshield wiper blade assembly constructed according to the present invention.

FIGURE 3 is a side elevational view of a typical wiper blade superstructure.

FIGURE 4 is a sectional view taken along line 4—4 of FIGURE 2.

FIGURE 5 is a fragmentary view, in elevation, depicting the manner of assembling the superstructure with the squeegee unit.

FIGURE 6 is a fragmentary view of another embodiment of the invention.

With particular reference to FIGURES 1 and 2, a windshield wiper blade assembly is shown comprising a squeegee unit 10 and a pressure distributing linkage, or superstructure, 30. The squeegee unit 10 is of the unitary type, as covered by the aforementioned patent application and comprises an elongate, resilient, flexible elastomeric body having portions of different hardness. More particularly, as shown in FIGURE 4, the unitary squeegee includes a relatively hard retention portion 12 and a relatively soft wiping body 14 interconnected with the retention portion by a thin neck 16 formed by flexure grooves 18. The wiper body has a wiping lip 20 along one edge and the retention portion 12 is formed with a pair of coplanar longitudinally extending grooves 22 which define a pair of flanges 24 between the retention portion and the wiping body 14.

The top of the retention portion 12 at the heel, or inner, end of the squeegee unit, as seen in FIGURE 5, is of greater width than the remaining portion and is interconnected therewith by tapered marginal edge surfaces 26. Moreover, the heel end of the top of the retention portion 12 is formed with an elongate centrally arranged slot 27 and a pair of marginal notches 28. The slot 27 in effect forms a pair of resilient fingers 29 which can be compressed to engage and disengage the superstructure with the squeegee unit, as will be pointed out more particularly hereinafter.

In the embodiment shown in FIGURE 6, the slot 27a does not communicate with the end of the squeegee as it does in the FIGURE 5 embodiment, and there are tapered marginal edge surfaces 26a on both sides of the notches 28.

The pressure applying superstructure 30 comprises a channel-shaped primary yoke 32 having a generally centrally located arm attaching connector 34 attached thereto by a transverse pivot 36. Opposite ends of the primary yoke 32 are connected by transverse pins 38 and 40 to channel-shaped secondary yokes 42 and 44, respectively. Portions of the secondary yokes 42 and 44 have nesting relation between the side walls of the channel-shaped primary yokes 32, and by reason of the pivotal connections between the primary and secondary yokes the linkage may be deemed flexible since the parts are relatively movable about axes transverse to the longitudinal axis of the wiper blade assembly. The ends of the secondary yokes 42 and 44 are formed with claws, or fingers, 46 which, as seen in FIGURE 4, straddle the top of the retention portion 12 of the unitary squeegee. In order to assemble the superstructure with the squeegee unit, the several claws, or feet, of the secondary yokes are engaged with the top of the retention portion, and slid longitudinally from the heel end of the squeegee unit towards the tip end. As the heel end of the secondary yoke 44 approaches the heel end of the squeegee unit, the side walls of the fingers 46 will engage the tapered surfaces 26 and compress the fingers 29 until fingers 46 are aligned with the notches 28. When the fingers 46 are aligned with the notches 28, the legs 29 will inherently spring apart to securely interlock the squeegee unit and the superstructure. It is noted that the longitudinal extent of the notches 28 is greater than the longitudinal extent of the fingers 46 so as to permit relative sliding movement therebetween when assembled.

In order to disengage the squeegee unit from the superstructure, such as may be required to replace the squeegee unit, it is only necessary to manually compress the legs 29 whereupon the fingers 46 on the heel yoke 44 can be disengaged from the notches 28 and slid longitudinally towards the heel end of the squeegee unit to disengage the squeegee unit from the superstructure.

While the embodiments of the invention as herein disclosed constitute preferred forms, it is to be understood that other forms might be adopted. For example, the back surface of the squeegee unit in which the notched retention means is provided may, if desired, comprise a thin metal or other relatively hard flexible backing strip cemented or mechanically secured to the squeegee rather than being an integral part of the squeegee itself as in the preferred embodiments described.

What is claimed is as follows:

1. A windshield wiper blade assembly including, a squeegee unit having greater flexibility in a plane normal to the surface to be wiped than in a plane parallel to said surface, a pressure applying superstructure engageable with said squeegee unit at a plurality of longitudinally spaced apart points, said squeegee unit comprising a unitary squeegee composed of an elongate resilient, flexible elastomeric body having portions of different hardness and a back composed of the hardest elastomeric material, said superstructure comprising a plurality of relatively movable members having free ends engageable with said back, and readily releasable interlock means adjacent one end of said squeegee unit comprising an elongate slot in said back, notched marginal edges on said back and tapered marginal edge surfaces leading to said notches whereby said superstructure can be locked with said squeegee unit by relative sliding movement therebetween, but said squeegee can only be disassembled from said superstructure by manually compressing said one end of said back.

2. A squeegee unit for a windshield wiper blade assembly comprising, a flexible, resilient, elongate elastomeric body having a wiping portion and a retention portion, said squeegee unit having strata of different hardness elastomeric material and having greater flexibility in a plane normal to the surface to be wiped than in a plane parallel to said surface, said retention portion having a back composed of the hardest elastomeric material with a longitudinally extending slot adjacent one end thereof, notched marginal edges adjacent said one end and tapered marginal edges terminating in said notches to form a pair of legs adapted to interlock with a pressure applying superstructure.

References Cited in the file of this patent

UNITED STATES PATENTS

| | | |
|---|---|---|
| 1,825,376 | Vaughn | Sept. 29, 1931 |
| 2,099,030 | Morrison | Nov. 16, 1937 |
| 2,706,305 | Oishei | Apr. 19, 1955 |
| 2,712,146 | Wise | July 5, 1955 |

FOREIGN PATENTS

| | | |
|---|---|---|
| 1,237,692 | France | June 20, 1960 |